US008613251B2

(12) United States Patent
Jays

(10) Patent No.: US 8,613,251 B2
(45) Date of Patent: Dec. 24, 2013

(54) CENTRIFUGAL JUICERS

(75) Inventor: Nicholas Ian Jays, Hampshire (GB)

(73) Assignee: Kenwood Limited, Hampshire (GB)

( * ) Notice: Subject to any disclaimer, the term of this patent is extended or adjusted under 35 U.S.C. 154(b) by 215 days.

(21) Appl. No.: 13/144,730

(22) PCT Filed: Jan. 13, 2010

(86) PCT No.: PCT/GB2010/050039
§ 371 (c)(1),
(2), (4) Date: Jul. 21, 2011

(87) PCT Pub. No.: WO2010/082046
PCT Pub. Date: Jul. 22, 2010

(65) Prior Publication Data
US 2011/0271849 A1    Nov. 10, 2011

(30) Foreign Application Priority Data

Jan. 19, 2009    (GB) .................................. 0900851.7

(51) Int. Cl.
*B26D 1/00*    (2006.01)
(52) U.S. Cl.
USPC .......................................................... 99/511
(58) Field of Classification Search
USPC ........ 99/510, 511, 512, 513; 100/213; 241/74
See application file for complete search history.

(56) References Cited

U.S. PATENT DOCUMENTS 5,819,641 A * 10/1998 Hsu .................................. 99/492
2006/0191425 A1 * 8/2006 Chang ............................. 99/511

FOREIGN PATENT DOCUMENTS

| DE | 3610741 A1 | 10/1987 |
| DE | 102004015884 A1 | 11/2005 |
| EP | 0980664 A2 | 2/2000 |
| GB | 1050956 A | 12/1966 |

OTHER PUBLICATIONS

British Search Report for British Application No. GB0900851.7, date of search May 14, 2009.
International Search Report mailed Apr. 21, 2010 for PCT/GB2010/050039 file Jan. 13, 2010.
Written Opinion of the International Searching Authority mailed Apr. 21, 2010 for PCT/GB2010/050039 file Jan. 13, 2010.

* cited by examiner

*Primary Examiner* — Geoffrey S Evans
*Assistant Examiner* — Brandon Harvey
(74) *Attorney, Agent, or Firm* — Fleit Gibbons Gutman Bongini & Bianco PL; Martin Fleit; Paul D. Bianco

(57)    ABSTRACT

The invention provides a centrifugal juicer with a removable bin for collection of unwanted pulp generated by the juicing process. The pulp is thrown upwardly and outwardly, and exits through a letterbox-like aperture which aligns with a filler aperture in the bin. The bin is slidably movable towards and away from the juicer and is open-topped; being covered during operation by a roof member which extends outwardly from the juicer. The bin (32) is provided, above the filler aperture, with a bridging member having a surface adapted to slide in contact with, or closely adjacent, the underside of the roof, thereby to wipe pulp deposits from the roof when the bin is slid away from the juicer for removal. The wiping surface of the bridging member may be shaped or configured to enhance the wiping action.

15 Claims, 4 Drawing Sheets

CENTRIFUGAL JUICERS

FIELD OF THE INVENTION

This invention relates to centrifugal juicers and it relates especially, though not exclusively, to juicers intended for the domestic market. Such juicers typically comprise motor-driven appliances capable of extracting the juice from natural produce such as fruits (typically citrus fruits) and/or vegetables, and delivering the juice into a vessel, such as a glass, a jug or a carafe, that is positioned adjacent the main body of the appliance to receive the juice by way of an outlet duct.

BACKGROUND OF THE INVENTION

Typically, such juicers incorporate a macerating device, such as a discoidal cutter plate, which is rotated at a reasonably high speed to pulp the fruits or vegetables being juiced; the cutter plate comprising, or at least being located near, the base of a frusto-conical filter member which is disposed in a generally cylindrical working space. The frusto-conical side wall of the filter member is pierced or otherwise formed with small holes and/or narrow slits, thus being sufficiently porous to permit juice to pass therethrough. The cutter plate, and usually also the filter member, are spun sufficiently rapidly to separate the juice from pulp residues, comprising mainly fibrous bulk matter; the juice passing through the apertures in the frusto-conical wall for collection and dispensing and the pulp residues being blocked by the filter member and generally thrown upwardly and outwardly therefrom.

The working space is capped by a lid, through the top of which passes a feed-chute designed to accommodate produce to be juiced, and a pusher is provided whereby the produce can be urged through the feed-chute and into abrasive contact with the cutter plate.

Appliances based upon the foregoing general arrangement are well established, can be economically manufactured and work quite well.

Difficulties arise however in certain respects; in particular the convenience and ease with which pulp residues can be collected and removed after the completion of one or more juicing cycles, depending upon the capacity of the appliance. As mentioned previously, the residues tend to be thrown around within and above the filter member and tend to adhere to internal surfaces of the juicer, particularly where the surfaces depart in any way from smooth, linear forms. It is to be borne in mind, in this respect, that the residues are thrown, when moist, against the internal juicer surfaces, and thus tend to adhere quite strongly, and it is found in practice that, due in part at least to the formation of vortices associated with the rapid rotational speeds employed, much of the pulp residue finds its way into the upper part of the working zone and adheres to internal surfaces of the lid.

Various attempts have been made to encourage the unwanted residues to adhere to filters or to enter traps, instead of coating the internal juicer surfaces, but to date no such arrangement has been found to work efficiently and in a user-friendly manner. It is thus an object of the present invention to address this problem.

DE-A-3610741 describes a juicer in which a rigid container, used to collect pulp ejected from a juicer, is replaced by a collapsible container in order to increase the pulp-handling capacity and thereby reduce the frequency of removal/emptying.

SUMMARY OF THE INVENTION

According to the invention there is provided a centrifugal juicer having a macerating device located in a working zone of the juicer capped by a lid and circumferentially bounded by a substantially upright wall; the lid having a circumferentially extending, dependant skirt which surrounds, is surrounded by, or abuts said substantially upright wall; the juicer further comprising means for rotating the macerating device about an axis of rotation, thereby to produce juice and pulp from produce urged against said macerating device, filter means for separating the juice from the pulp, means for collecting the juice and for storing collected juice in communication with a juice outlet duct, and means for collecting the pulp; the means for collecting the pulp communicating with said working zone through a letterbox-like aperture in said dependant skirt of said lid and/or said substantially upright wall, and comprising a removable container formed with a filler aperture alignable with the letterbox-like aperture; said letter-box like aperture and said filler aperture being so located, in relation to said working zone, as to encourage transition of pulp into said removable container.

By this means, the pulp is encouraged to flow through the letterbox-like aperture and the filler aperture, which preferably are closely juxtaposed and substantially in register when the container is installed to the juicer, and a very high percentage of the pulp is thereby collected in the container.

Preferably, the container is mounted for sliding movement, towards and away from the juicer, for installation and removal.

Further preferably, a roof extending from the lid of the juicer forms a cap for the container when the container is installed to the juicer, and the filler aperture in said container is bounded in part by an upper bridging member having a surface adapted to slide in contact with, or closely adjacent, the underside of said roof, thereby to wipe pulp deposits from said roof when the container is slid away from the juicer for removal.

It is preferred in some instances that said surface of the upper bridging member is shaped or otherwise configured to enhance the wiping action relative to the underside of said roof.

In a preferred embodiment of the invention, the letterbox-like aperture is principally formed in said dependant skirt of the lid and a lower edge thereof is formed by an upwardly facing rim of said substantially upright wall.

It is further preferred that the said roof portion extending from said lid is formed with dependent side members extending at least as far as the said dependant skirt of the lid and bearing runner means adapted to co-operate with complementary runner means carried by said container to accommodate said to and fro sliding movement.

It is still further preferred that the container is formed with a handle whereby the container can be carried and also manipulated for said sliding movement; and moreover that the handle is formed with latch means adapted to engage with complementary latching means borne by the said roof to releasably latch the container to the juicer when the latch means is fully engaged with the latching means.

In a particularly preferred embodiment of the invention, the lid is made of transparent, or at least substantially transparent, plastics material, thereby enabling the progress of the juice-making operation in the working zone to be observed. Preferably also, the said roof is made of the same or a similar plastics material, permitting the status of the container, as regards its content of pulp deposits, to be monitored by a user. The roof may be integrally formed with the lid.

It is preferred further that said letterbox-like aperture and said filler aperture are juxtaposed to define for said removable container a collection aperture which is offset circumferentially with respect to a diameter of the working zone aligning with said juice outlet duct; the offset being such that a larger proportion of the collection aperture faces the direction of rotation of the macerating device; thereby creating a retaining wall for trapping ejected pulp in the removable container and resisting re-circulation of pulp from the removable container into the working zone.

In some preferred embodiments of the invention, the juicer further comprises a safety interlock means configured such that said means for rotating the macerating device is rendered inoperative unless the removable container is operationally installed to said juicer.

In some preferred embodiments, the letterbox-like exit aperture from the working zone of the juicer is provided with side walls, and possibly also a base wall, protruding through the filler aperture into the removable container, thereby creating a chute intended to assist in directing pulp into the container.

The juicer may advantageously further comprise means to provide a tactile indication when the container is operationally installed to the body of the juicer, and such means may, in preferred embodiments, comprise first and second spring-loaded ball catches provided on the juicer body and positioned to snap into respective recesses formed in the base of the removable container.

BRIEF DESCRIPTION OF THE DRAWINGS

In order that the invention may be clearly understood and readily carried into effect, one embodiment thereof will now be described, by way of example only, with reference to the accompanying drawings, of which.

DETAILED DESCRIPTION OF THE INVENTION

Figure 1:
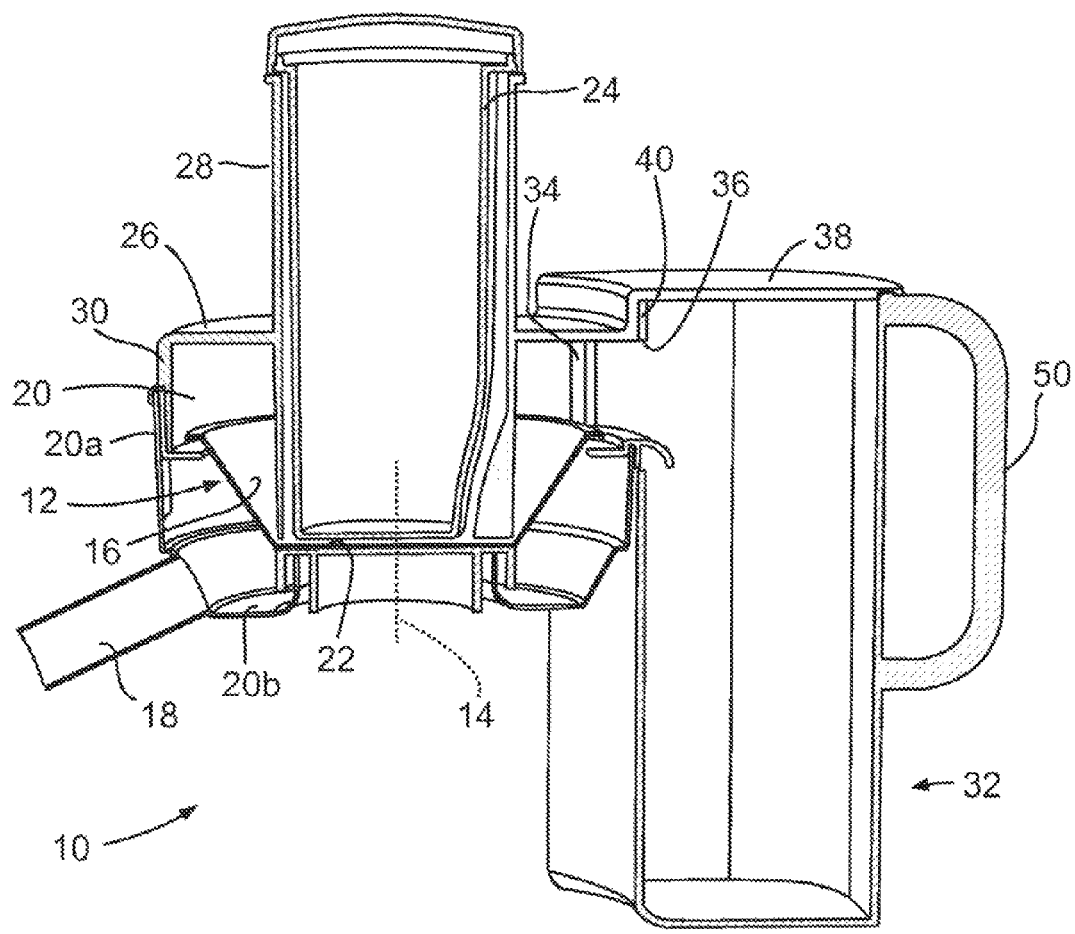
FIG. 1 shows, in cross-sectional view, the essential components of a centrifugal juicer in accordance with one example of the invention.
Figure 2:
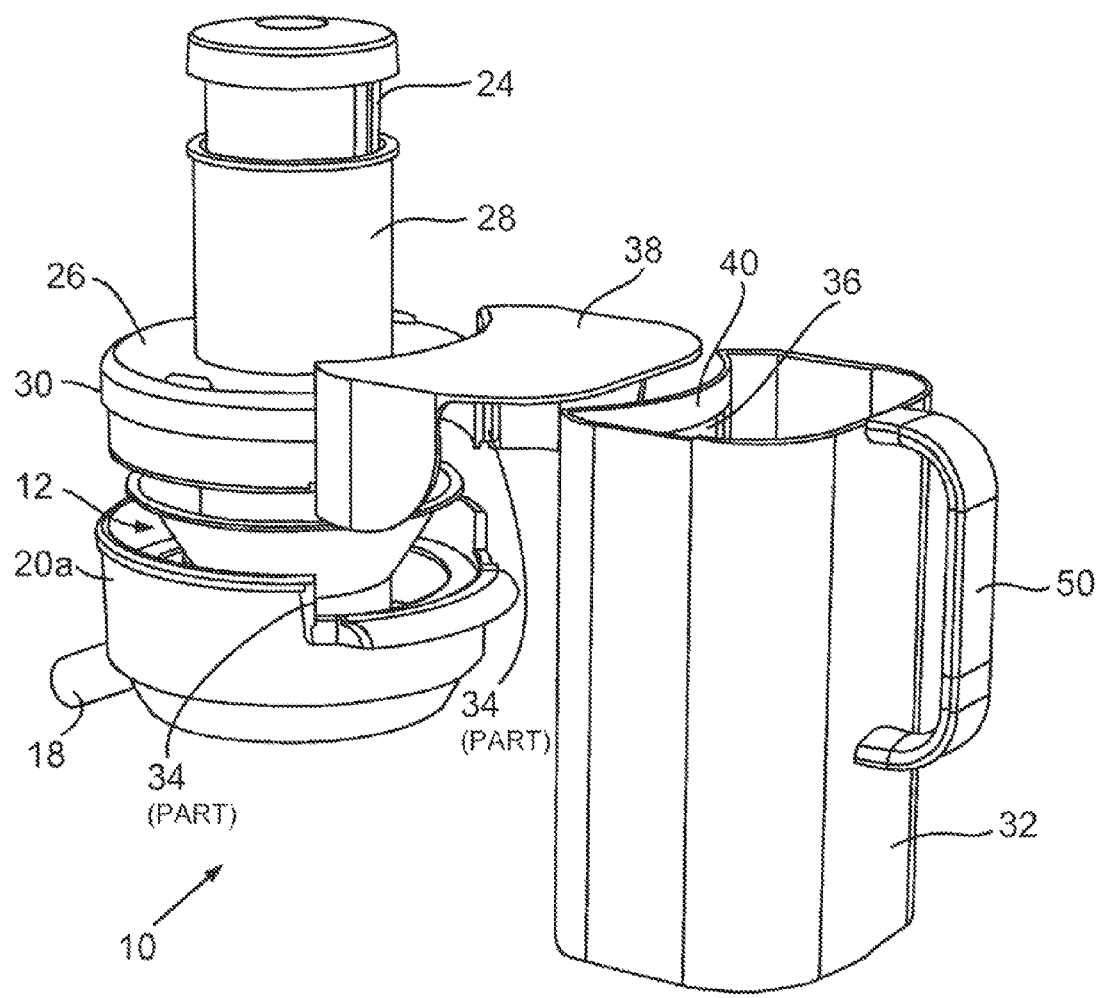
FIG. 2 shows, in perspective view, the components of the juicer shown in FIG. 1.
Figure 3:
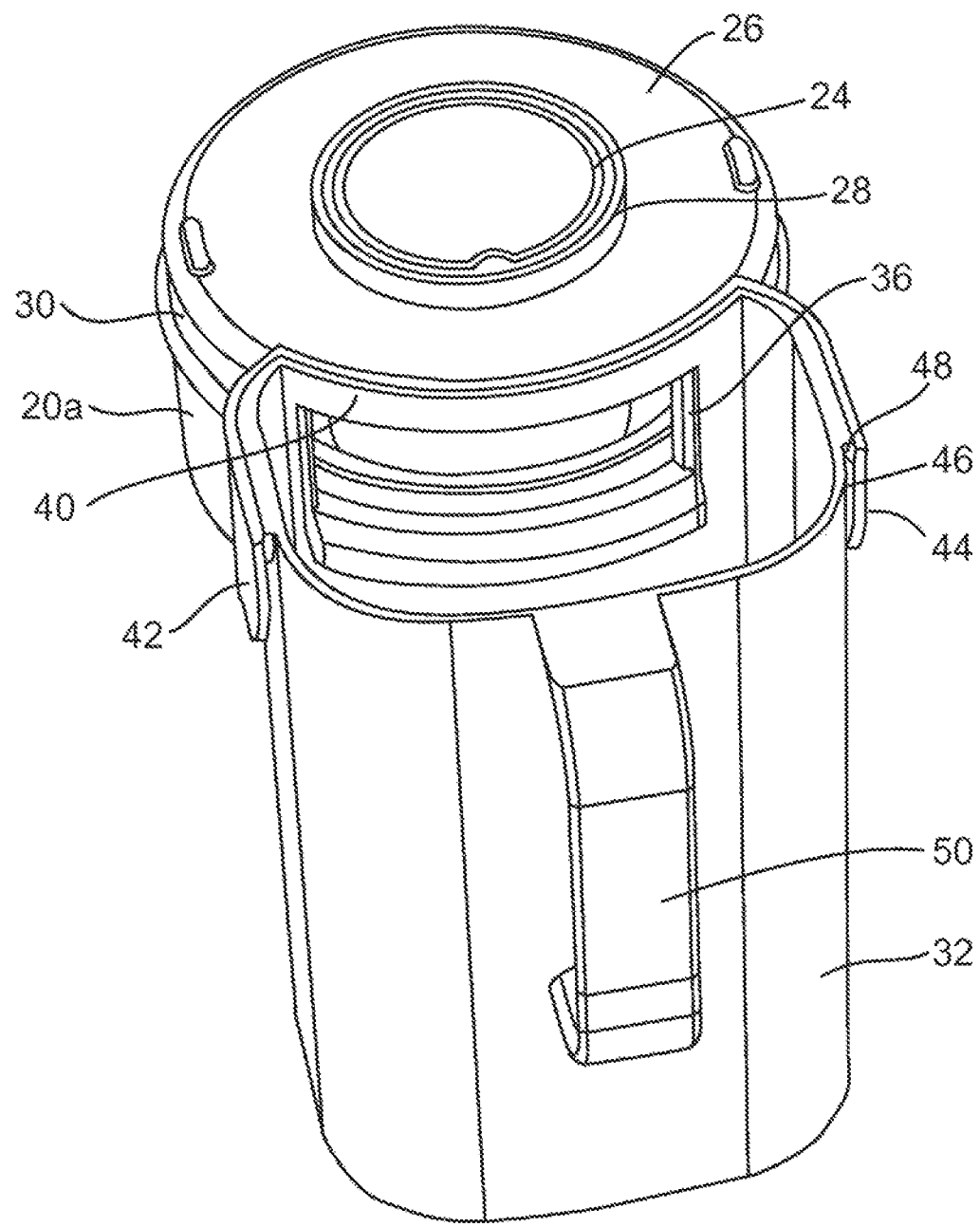
FIG. 3 shows a view from the rear of the juicer of FIGS. 1 and 2, with a portion removed for clarity.

Referring now to the drawings, a centrifugal juicer is shown in part at 10, and includes an open-topped, frusto-conical filter bowl 12, rotatable about its vertical central axis 14 and formed with a foraminated side wall 16, through which juice is intended to pass on its way to a juice outlet duct 18 formed at or near the base 20b of a substantially cylindrical wall 20a bounding the working zone 20 of the juicer 10. The side wall 16 of the filter bowl 12 thus forms, in this specific example, a filter means for separating the juice from unwanted residues of the juicing process, and it will be appreciated that the lower part of the working zone constitutes a means for collecting the juice in communication with the juice outlet duct 18. The filtering action of wall 16 may, in some instances, be enhanced or supplemented by the provision of an additional filter; some such additional filters being disposable and others being washable and reusable.

A discoidal macerating plate 22 is typically incorporated into, or mounted just above, the base of the frusto-conical filter bowl 12. In some embodiments, the bowl 12 and the macerating plate 22 are integrally formed or attached to one another, and rotate together in the same direction and at the same rate. In alternative embodiments, the two components may rotate in the same direction at different rates or in opposite directions. In some sophisticated appliances, different combinations of the foregoing rotational arrangements may be available, either being called into use automatically, depending upon function selections made by the user, or manually, as directly selectable user options.

A lid 26 for the appliance covers the working zone 20, and is formed with a feed-tube 28, through which produce from which juice is to be extracted can be introduced into the appliance; the lid being removably mounted upon the substantially cylindrical wall 20a where it bounds the upper part of the working zone 20, within which the frusto-conical filter bowl 12 and the macerating plate 22 rotate. A pusher device 24 is also provided; the pusher being in the nature of a rod, shaped and dimensioned to pass through the feed-tube and intended for use, in known manner, to urge the produce against the macerating plate 22. Typically, the pusher 24 is a slidable fit in the feed-tube 28; the external configuration of the pusher matching the shape of the inner surface of the feed-tube. It will be appreciated that the feed-tube 28 provides an aperture, through the lid 26, which is closed by the insertion of the pusher 24.

The plate 22 may contain or be formed with any convenient contrivance, such as upstanding blades, ribs, teeth or other protuberances, for macerating the produce to be juiced.

As described thus far, therefore, the juicer comprises (inter alia) a macerating device 22 and a filter bowl 12 located in a working zone 20 of the juicer. The upper part of the working zone 20 is capped by the lid 26 and circumferentially bounded by the substantially cylindrical upright wall 20a, disposed outside of the frusto-conical filter bowl 12; the bounding wall 20a being surrounded by, surrounding, or abutting a dependant skirt 30 of the lid 26. An electric motor (not shown) is provided, the motor being operated and controlled in known manner to rotate the macerating device 22 and the filter bowl 12 about its axis of rotation 14, thereby to produce juice and pulp from produce urged against it by the aforementioned pusher 24. The foraminated wall 16 of the filter bowl 12 acts to separate the juice from the pulp; the juice being collected and dispensed as described earlier. As mentioned previously, additional filter components may be provided to supplement the action of the wall 16 if desired. In this respect, for example, some juicers employ disposable filters to line the interior of the wall 16 and thereby enhance the filtration efficiency, but the applicability of the present invention is not affected by the specific filtration set-up used.

The pulp, which is prevented by the wall 16 of the filter bowl 12 from proceeding towards the outlet 18, tends to be thrown upwardly and outwardly, towards the upper part of the working zone and, in particular, towards the underside of the lid 26 and the upper part of the wall 20a and/or the dependant skirt 30 of the lid 26, depending upon the particular construction used in that area. In accordance with this example of the invention, as will now be described, there is provided a removable container, such as a bin 32, for collecting the pulp. The bin 32 communicates with the working zone of the juicer through a letterbox-like aperture 34 formed, in this example, primarily through the dependant skirt 30 of the lid 26, with the lower lip of the letterbox-like aperture being formed by an upwardly facing rim of the wall 20a.

It will be appreciated that, in other embodiments, the aperture 34 can be formed to a greater extent within the wall 20a or indeed wholly within the wall 20a, depending upon the precise construction of the lid 26, the extent of the dependant skirt 30 and the interface between the skirt and the wall.

Bin 32 is formed so as to be slidably removable from the juicer in a direction perpendicular to the rotational axis 14 of the juicer, and it is formed with a filler aperture 36 aligned with the letterbox-like aperture 34. The apertures 34 and 36 are so located that the pulp, thrown upwardly and outwardly as previously described, and entrained by a swirling airstream, preferentially leaves the working zone 20 of the juicer therethrough, and is thrown into the bin 32. By this means, a high proportion of the pulp created by the juicing process is efficiently collected in the bin 32. In some practical embodiments of the invention, more than 90% of the pulp is consistently collected in the above manner, leaving the internal surfaces of the juicer and, in particular, the lid 26 relatively free of unwanted pulp residues.

It is preferred (though not currently essential) to provide a safety interlock to ensure that the motor of the centrifugal juicer 10 can not run unless the bin 32 is properly positioned and located to the juicer body. In one embodiment, this interlock is provided by a reed switch, mounted to the juicer body, which controls the supply of current to the motor and which is open (i.e. blocks current supply) unless it senses the presence of a magnet carried by the bin 32. Any suitable form or type of safety interlock can be used, however.

In a particularly favoured construction, as shown in the drawings, a roof 38 extends outwardly from the lid 26 of the juicer and forms a cap for the bin 32 when the latter is installed to the juicer. The roof 38 is, in this example, integrally formed with the lid 26 but this need not necessarily be the case and the roof may be formed separately from and attached to the lid 26 if preferred.

In any event, the bin 32 is mounted for sliding movement towards and away from the juicer for installation thereto and removal therefrom. In this respect, it is preferred that, as shown, the upper part of the filler aperture 36 of the bin 32 is bounded by an upper bridging member 40 adapted to slide in contact with, or closely adjacent, the underside of the roof 38, thereby to automatically wipe pulp deposits from said roof when the container is slid away from the juicer for removal and emptying. The surface of the upper bridging member 40 that faces the underside of the roof 38 may, if desired, be shaped or configured to enhance the wiping action. For example, the material of the bridging member may be thinned in the area of the facing surface, in order to permit flexure thereof. In an alternative arrangement, the facing surface may be fitted with a flexible, elastomeric wiping member.

In some embodiments of the invention, the apertures 34 and 36 are of substantially the same size but, in this exemplary embodiment, the aperture 36 is slightly larger than the aperture 34 when measured circumferentially of the working chamber 20. In any event, the two apertures are intended to be closely juxtaposed and substantially in register when the bin 32 is assembled to the juicer 10. It will thus be appreciated that the two apertures need not be of the same size, provided that they collectively determine the overall dimensions of the exit aperture through which the pulp leaves the working zone 20 of the juicer and enters the bin 32.

In the above-described embodiment of the invention, the letterbox-like aperture 34 is formed principally in the dependant skirt 30 of the lid 26 but, if preferred, the aperture 34 may extend into, or be primarily or wholly formed within, the outer wall 20a of the main body of the juicer, depending upon the precise nature of the relationship between the wall 20a and the dependant skirt 30 of the lid 26, which may (as mentioned previously) surround, be surrounded by, or abut the upper part of the wall 20a.

In this exemplary embodiment, the roof portion 38, extending from the lid 26, is formed with dependent side members 42 and 44 extending downwardly at least as far as does the dependant skirt 30 of the lid 26, and runner means such as 46 are provided to co-operate with complementary runner means such as 48, carried by the bin 42, to accommodate said to and fro sliding movement. The side members 42 and 44 are dimensioned in depth and length to provide adequate sealing against leakage of materials, taking into account the operating parameters of the device as a whole; thus the dimensions shown in the drawings are not intended to be definitive of any preferred arrangement in this respect.

In preferred embodiments, the exit aperture 34 from the working zone 20 is provided with side walls, and possibly also a base wall, protruding through the filler aperture 36 into the bin 32 and thereby creating a chute intended to assist in directing pulp into the bin.

In some embodiments it is preferred to provide a tactile indication when the bin 32 has been fully pushed home into position against the body of the juicer 10, and is thus properly installed for use. In one such embodiment, two spring-loaded ball catches are provided on the juicer body, positioned to snap into respective recesses formed in the base of the bin 42. This arrangement also assists in supporting and locating the bin 32 in the correct position for use.

The container is, in this example, formed with a handle 50 whereby the bin can be carried and also manipulated for the aforementioned sliding movement. A latching means of any convenient kind (not shown), is provided to releasably latch the bin 32 to the juicer. The latching means preferably includes a manually actuatable latch, incorporated into the handle 50, having an element which engages with a co-operative element presented by or formed into the underside of the roof portion 38. In the latched condition, it will be appreciated that the two letterbox-like apertures 34 and 36 are at least substantially aligned and are closely juxtaposed. It will be appreciated that the latching means should provide sufficient retentive strength to resist separation forces created by the ejected pulp.

Typically, the lid 26 is made of transparent, or at least substantially transparent, plastics material, thereby enabling the progress of the juice-making operation in the working zone 20 to be observed. Preferably also, the roof 38 is made of the same or a similar plastics material, permitting the status of the bin 32, as regards its content of pulp deposits, to be monitored by a user. As mentioned previously, the roof may be integrally formed with the lid.

Depending upon the dynamics of the flow of pulp ejected into the bin 32, it can be useful in some circumstances to provide the roof 38 with curved deflector ribs running along its peripheral edges and intended to improve the sealing of the roof to the bin. Such ribs are effective to guide pulp away from the seal without detrimentally affecting the wiping action of the upper wall surface of the bridging member 40 along the underside of the roof 38.

It will be appreciated that the dimensions of the apertures 34 and 36 will be influenced by various criteria specific to individual juicer designs, for example the sizes of the macerating plate, the filter and of the working zone or centrifuge. In one particular example, which is not intended to limit the scope of the claims hereof, and for a working zone of between 160 mm and 180 mm in diameter and between 40 mm and 50 mm high, typical dimensions for the aperture 34 are between 100 mm and 110 mm wide and between 35 mm and 55 mm high, with corresponding typical dimensions for the aperture 36 being between 110 mm and 120 mm wide and between 50 mm and 60 mm high.

Figure 4:
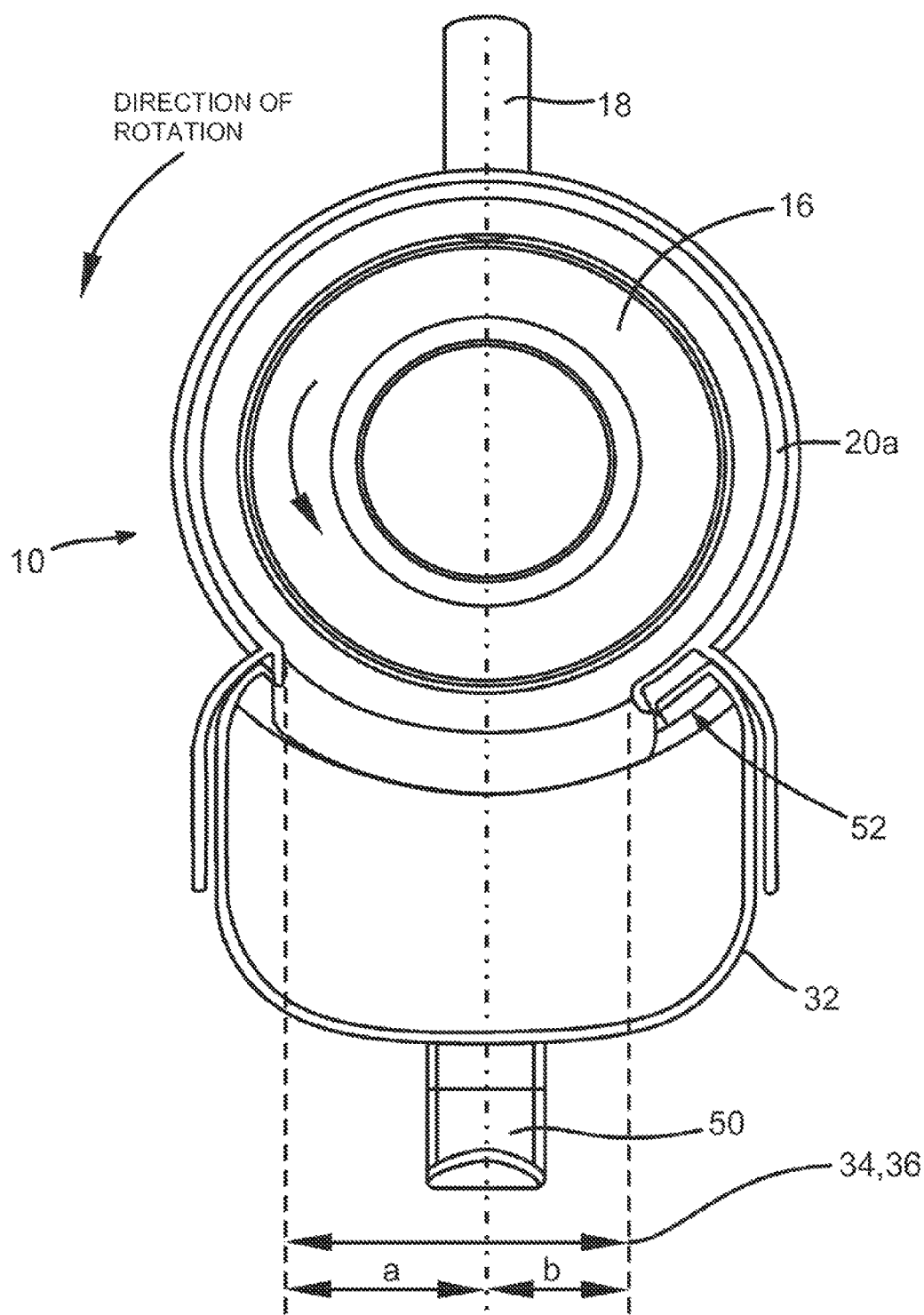
FIG. 4 shows a plan view of the juicer, with its lid and roof extension removed, to illustrate an optional configuration in accordance with one particular example of the invention.

In some embodiments of the invention, as shown in FIG. 4, the collection aperture formed by the juxtaposition of apertures 34 and 36 is offset circumferentially, with a larger proportion of the collection aperture's open area facing the direction of rotation of the frusto-conical filter bowl 12. This configuration creates a retaining wall 52, formed by the rim of the wall 20a, the skirt 30 of the lid 20 and the bin 32, which traps ejected pulp in the bin 32 and helps to resist re-circulation of the pulp into the working zone 20.

As shown in FIG. 4, the letterbox-like aperture 34 and the filler aperture 36 are juxtaposed to define for the removable container 32 a collection aperture which is offset circumferentially with respect to a diameter of the working zone aligning with the juice outlet duct 18 (and also, in this case, the handle 50 of the container 32); the offset being such that, if the dimension of the collection aperture as a whole is (a+b) as measured in the direction of rotation (i.e. circumferentially of the wall 20a bounding the working zone), a larger proportion (a) of the relevant collection aperture dimension faces the direction of rotation of the macerating device; thereby creating a retaining wall 52 on the downstream side of rotation, for trapping ejected pulp in the removable container and resisting re-circulation of pulp from the removable container into the working zone.

By means of the invention described herein, the bulk of the unwanted pulp residue is conveniently and cleanly collected and retained for disposal in the bin 32.

The invention claimed is:

1. A centrifugal juicer having a macerating device located in a working zone of the juicer capped by a lid and circumferentially bounded by a substantially upright wall; the lid having a circumferentially extending, dependent skirt which surrounds, is surrounded by, or abuts the substantially upright wall; the juicer further comprising means for rotating the macerating device about an axis of rotation, thereby to produce juice and pulp from produce urged against the macerating device, filter means for separating the juice from the pulp, means for collecting the juice and for storing collected juice in communication with a juice outlet duct, and means for collecting the pulp; the means for collecting the pulp communicating with the working zone through a exit aperture in the dependent skirt of the lid and/or the substantially upright wall, and including a removal container formed with a filler aperture alignable with the exit aperture; the exit aperture and the filler aperture being so located, in relation to the working zone (20), as to be capable of receiving pulp from the working zone to be passed into the removable container; wherein the removable container is mounted for sliding movement, towards and away from the juicer, for installation and removal; wherein a roof extending from the lid of the juicer and forming a cap for the removable container when the removable container is installed in the juicer; and wherein the filler aperture in the removable container is bounded in part by an upper bridging member having a surface adapted to slide in contact with, or closely adjacent, an underside of the roof, thereby to wipe pulp deposits from the roof when the removable container is slid away from the juicer for removal.

2. The centrifugal juicer according to claim 1, wherein the exit aperture is formed wholly in the dependent skirt of the lid.

3. The centrifugal juicer according to claim 1, wherein the exit aperture is principally formed in the dependent skirt of the lid and a lower edge of the exit aperture is formed by an upwardly facing rim of the substantially upright wall.

4. The centrifugal juicer according to claim 1, wherein the roof extending from the lid is formed with dependent side members extending at least as far as the dependent skirt of the lid and bearing runner means adapted to co-operate with complementary runner means carried by the removable container to accommodate the towards and away from the juicer sliding movement.

5. The centrifugal juicer according to claim 1, wherein the removable container is formed with a handle whereby the removable container can be carried and also manipulated for the sliding movement.

6. The centrifugal juicer according to claim 5, wherein the handle is formed with latch means adapted to engage with complementary latching means borne by the roof to releasably latch the removable container to the juicer when the latch means is fully engaged with the latching means.

7. The centrifugal juicer according to claim 1, wherein the lid is made of transparent, or at least substantially transparent, plastics material, thereby enabling progress of juice-making operation in the working zone to be observed.

8. The centrifugal juicer according to claim 7, wherein the roof is made of the same or similar plastics material as the lid, permitting status of the removable container, regarding content of pulp deposits, to be monitored by a user.

9. The centrifugal juicer according to claim 1, wherein the roof is integrally formed with the lid.

10. The centrifugal juicer according to claim 1, wherein the exit aperture and the filler aperture are juxtaposed to define for the removable container a collection aperture which is offset circumferentially with respect to a diameter of the working zone aligning with the juice outlet duct; the offset being such that a larger proportion of the collection aperture faces a direction of rotation of the macerating device; thereby creating a retaining wall for trapping ejected pulp in the removable container and resisting re-circulation of pulp from the removable container into the working zone.

11. The centrifugal juicer according to claim 1 further comprising a safety interlock means configured such that the means for rotating the macerating device is rendered inoperative unless the removable container is operationally installed to the juicer.

12. The centrifugal juicer according to claim 1, wherein the surface of the upper bridging member is shaped or configured to enhance wiping action relative to the underside of roof.

13. The centrifugal juicer according to claim 1, wherein the exit aperture from the working zone of the juicer is provided with side walls, and a base wall, protruding through the filler aperture into the removable container, thereby creating a chute intended to assist in directing pulp into the removable container.

14. The centrifugal juicer according to claim 1, further comprising means to provide a tactile indication when the removable container is operationally installed to a body portion of the juicer.

15. The centrifugal juicer according to claim 14, wherein the means to provide a tactile indication comprises first and second spring-loaded ball catches provided on the body portion of the juicer and positioned to snap into respective recesses formed in a base of the removable container.

* * * * *

UNITED STATES PATENT AND TRADEMARK OFFICE
CERTIFICATE OF CORRECTION

PATENT NO.        : 8,613,251 B2
APPLICATION NO. : 13/144730
DATED             : December 24, 2013
INVENTOR(S)       : Nicholas Ian Jays It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this
Twenty-second Day of September, 2015

Michelle K. Lee
*Director of the United States Patent and Trademark Office*